United States Patent
Wargo

(10) Patent No.: US 9,776,215 B2
(45) Date of Patent: Oct. 3, 2017

(54) PARCEL HANDLING METHODS

(71) Applicant: Laitram, L.L.C., Harahan, LA (US)

(72) Inventor: Stephen G. Wargo, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/415,456

(22) PCT Filed: Jul. 29, 2013

(86) PCT No.: PCT/US2013/052455
§ 371 (c)(1),
(2) Date: Jan. 16, 2015

(87) PCT Pub. No.: WO2014/028204
PCT Pub. Date: Feb. 20, 2014

(65) Prior Publication Data
US 2015/0209831 A1    Jul. 30, 2015

Related U.S. Application Data

(60) Provisional application No. 61/682,562, filed on Aug. 13, 2012.

(51) Int. Cl.
*B07C 3/08* (2006.01)
*B07C 5/36* (2006.01)
(Continued)

(52) U.S. Cl.
CPC ............... *B07C 5/36* (2013.01); *B07C 1/02* (2013.01); *B07C 3/20* (2013.01); *B07C 7/00* (2013.01);
(Continued)

(58) Field of Classification Search
CPC .... B07C 1/02; B07C 1/04; B07C 1/06; B07C 1/18; B07C 3/06; B07C 3/065;
(Continued)

(56) References Cited

U.S. PATENT DOCUMENTS

| | | |
|---|---|---|
| 2,669,365 A | 2/1954 | Gourdon |
| 4,044,897 A | 8/1977 | Maxted |

(Continued)

FOREIGN PATENT DOCUMENTS

| | | |
|---|---|---|
| EP | 0130810 A1 | 1/1985 |
| GB | 2062566 A | 5/1981 |
| WO | 9832545 A1 | 7/1998 |

OTHER PUBLICATIONS

Partial Supplementary European Search Report, Application No. 1382979.0-1706, Patent No. 2882650, dated Aug. 2, 2016, European Patent Office, Munich, DE.

(Continued)

*Primary Examiner* — Joseph C Rodriguez
(74) *Attorney, Agent, or Firm* — James T. Cronvich

(57) ABSTRACT

Methods for preparing parcels for final sorting. The methods include dividing a mass flow of parcels into individual streams, separating and singulating the parcels in each stream, delivering each stream at a steady rate to a human operator that faces and culls the parcels, reading identifying indicia on the parcels, delivering the scanned parcels to a presorter in parallel lanes, and selectively discharging parcels from the lane closest to a side of the presorter off the side at multiple discharge points.

11 Claims, 1 Drawing Sheet

(51) Int. Cl.
  *B65G 47/50* (2006.01)
  *B07C 3/20* (2006.01)
  *B07C 1/02* (2006.01)
  *B07C 7/00* (2006.01)
  *B07C 3/06* (2006.01)
  *B65G 47/26* (2006.01)

(52) U.S. Cl.
  CPC .............. *B65G 47/503* (2013.01); *B07C 3/06* (2013.01); *B65G 47/26* (2013.01)

(58) Field of Classification Search
  CPC .... B07C 3/08; B07C 3/10; B07C 3/20; B07C 7/00; B07C 7/005; B07C 7/04; B65G 15/12; B65G 47/26; B65G 47/30; B65G 47/50; B65G 47/503; B65G 2207/30
  See application file for complete search history.

(56) References Cited

U.S. PATENT DOCUMENTS

| | | | |
|---|---|---|---|
| 4,555,010 A | 11/1985 | Solund | |
| 5,038,911 A | 8/1991 | Doane et al. | |
| 5,547,084 A | 8/1996 | Okada et al. | |
| 5,638,938 A | 6/1997 | Lazzarotti et al. | |
| 5,782,332 A | 7/1998 | Guidetti et al. | |
| 6,209,703 B1 | 4/2001 | Soldavini | |
| 6,471,044 B1 | 10/2002 | Isaacs et al. | |
| 6,478,138 B1 | 11/2002 | Edwards et al. | |
| 6,499,604 B1* | 12/2002 | Kitson | B07C 3/08 198/371.2 |
| 6,758,323 B2* | 7/2004 | Costanzo | B65G 13/10 198/370.09 |
| 7,006,891 B2 | 2/2006 | Roth et al. | |
| 7,145,095 B2* | 12/2006 | Cerutti | B07C 3/02 198/370.01 |
| 7,448,499 B2 | 11/2008 | Roth | |
| 7,562,760 B2* | 7/2009 | Affaticati | B07C 5/36 198/357 |
| 7,816,617 B2* | 10/2010 | Bennett | B07C 3/02 198/349 |
| 7,870,945 B2 | 1/2011 | Mileaf | |
| 8,123,021 B2* | 2/2012 | DePaso | B65G 17/24 198/370.09 |
| 8,408,380 B2* | 4/2013 | Doane | B65G 43/08 198/460.1 |
| 8,457,781 B2* | 6/2013 | Bailey | B07C 3/00 700/224 |
| 8,575,507 B2* | 11/2013 | Pippin | B07C 1/02 209/584 |
| 9,085,422 B2* | 7/2015 | Cristoforetti | B65G 17/24 |
| 2007/0075000 A1* | 4/2007 | Martens | B07C 3/08 209/584 |
| 2011/0022221 A1 | 1/2011 | Fourney | |
| 2016/0263622 A1* | 9/2016 | El Bernoussi | B25J 9/0093 |

OTHER PUBLICATIONS

Supplementary European Search Report, EP Patent Application No. 13829790.8. European Patent Office, dated Feb. 15, 2016.

\* cited by examiner

PARCEL HANDLING METHODS

BACKGROUND

The invention relates generally to power-driven conveyors and more particularly to methods for preparing parcels for sorting.

In typical parcel-sorting systems, a bulk flow of parcels (envelopes and packages) is distributed to a number of individual conveyors. A human operator at each conveyor arranges the parcels on an adjacent conveyor so that they are facing up and in a single file. The face-up single files of parcels are inducted onto a main conveyor where they are scanned so that they can be appropriately sorted downstream. This process is labor-intensive and paced by the operators.

SUMMARY

According to one aspect of the invention, a method for handling parcels comprises:
(a) separating a mass flow of parcels into two or more individual streams of parcels;
(b) singulating the parcels in each of the individual streams of parcels; (c) delivering each individual stream of parcels at a steady rate to a corresponding individual culling and facing station; (d) manually culling unacceptable parcels from the individual stream of parcels at each culling and facing station; and (e) manually facing acceptable parcels at each culling station so that identifying indicia on the parcels can be read downstream.

According to another aspect of the invention, a method for handling parcels comprises: (a) feeding two or more streams of singulated parcels onto a sorter in parallel lanes; (b) discharging a parcel from a spot in a lane closest to a side of the sorter off the side of the sorter at a selected of multiple discharge points; and (c) diverting a neighboring parcel from an adjacent lane to occupy the spot vacated by a parcel discharged off the side of the sorter for subsequent discharge from the lane closest to the side of the sorter.

BRIEF DESCRIPTION OF THE DRAWINGS

These features of the invention are described in more detail in the following description, appended claims, and accompanying drawings, in which:

DETAILED DESCRIPTION

Figure 1:
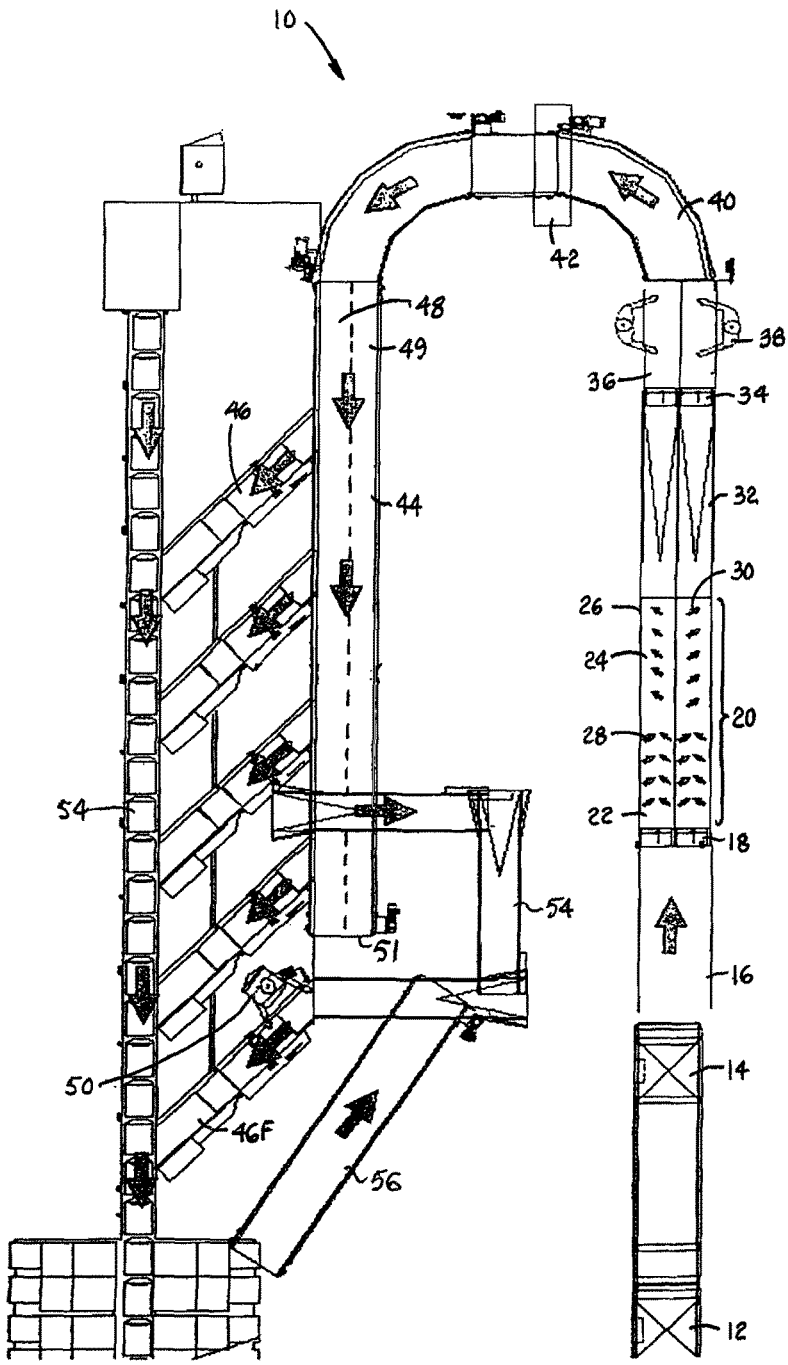
FIG. 1 is a top plan view of a conveyor system embodying features of the invention.

A conveyor system embodying features of the invention is shown in FIG. 1. In the conveyor system 10, pallet loads of parcels 12 are emptied by unloaders 14 and deposited onto a bulk conveyor 16, which may be a chute or a conveyor belt, such as an in-line roller belt, that allows the parcels to accumulate with low back line pressure when the upstream supply of parcels exceeds the downstream demand. The bulk flow of parcels is metered downstream in a metering conveyor 18, such as a friction-top belt operated at a predetermined speed. The metered bulk flow of parcels is fed onto a separator 20, which singulates the parcels from the metering conveyor into two streams.

The separator may be realized with a two-lane, angled-roller centering belt or roller conveyors arranged in a similar pattern 22 followed by an angled-roller alignment belt or roller conveyors arranged in a similar pattern 24 that aligns parcels on each half of the belt against side rails 26. Rollers in the two-lane centering belt 22 are actuated to rotate in the direction of arrows 28 to direct the mass flow of parcels into two single-file streams in the middle of each lane. The single files of parcels are then aligned against the opposite side rails 26 by the alignment belt, whose rollers are actuated to divert parcels toward the outer sides of the conveyor as indicated by the arrows 30. The alignment belt may be run at a higher speed than the centering belt to increase the separation between consecutive parcels in each stream.

The two streams of parcels are fed to a buffer conveyor 32, which may be a chute or an in-line roller conveyor belt, to allow parcels in the two lanes to accumulate as necessary. The buffer conveyor 32 feeds the two lanes of parcels to a second metering conveyor 34 set to run at a predetermined speed to release the two streams at a fixed, steady rate to a pair of human operators 38—one for each stream—manning a facer conveyor 36 at individual culling and facing stations. In this way, the process is paced by the system and not by the operators.

Each human operator culls and faces the parcels in his assigned stream. Trash and parcels that are unacceptable (e.g., oversized or overweight) with downstream processing equipment, that are unlabeled, or that are otherwise problematic are culled from the stream by the operator. The operator also faces acceptable parcels with identifying indicia, such as printed labels, oriented so that they may be read by a video scanner downstream. The operator also singulates any side-by-side or piggyback parcels not completely singulated by the separator.

The two culled, faced, and singulated streams of parcels are fed by the facer conveyor 36 onto a scan conveyor 40, shown as a horse-shoe belt in this example for a compact footprint. But the scan conveyor segment could be linear. The scan conveyor can run at a higher speed to increase the gap between consecutive parcels in each stream. A scanning station 42 including at least one camera positioned over the scan conveyor monitors the two streams and reads the label on each parcel. The scan conveyor feeds the two streams of read parcels onto an induction sorter 44, which sorts the two lanes of parcels to multiple discharge points, such as induction conveyors 46 along one side of the induction sorter.

The induction sorter may be realized by a range of technology including a roller belt such as an INTRALOX® Series 7000 sorter belt and roller-activation system 47. The roller-activation system includes a series of individually actuated roller-activation mechanisms that control the rotation of the belt rollers in the sorter belt. The mechanisms are sequentially disposed in individual zones along the length of the induction sorter in each lane corresponding to the induction conveyors 46. The induction sorter selectively discharges parcels in the right-hand lane 48 off the conveyor belt and onto a selected induction conveyor 46. Once a spot in the right-hand lane has been vacated, the sorter can move a parcel from the left-hand lane 49 to the right-hand lane for diversion onto one of the induction conveyors. If all the induction conveyors 46 are full or a parcel is missorted, the induction sorter 44 delivers the parcel off its end 51 to a key station operator 50. Misread and unread parcels are also routed via a conveyor 54 to the key station operator 50, who can then manually key the received parcels and load them onto a final induction conveyor 46F or send them to a remote encoding station for keying. Parcels rejected downstream may also be sent to the key station operator via a final return conveyor 56

The induction conveyors 46, which are shown as angled obliquely relative to the lanes of parcels in the main conveying direction of the induction sorter 44, convey the parcels to downstream processing via a tray conveyor 54.

Figure 2:
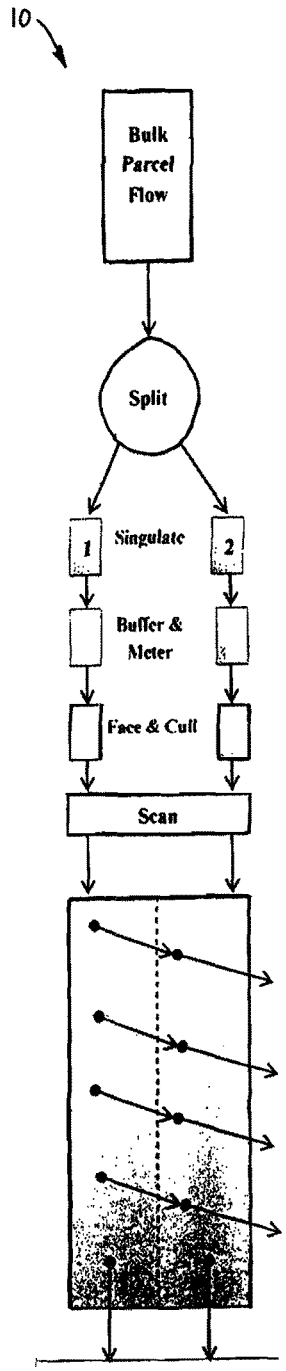
FIG. 2 is a block diagram of the conveyor system of FIG. 1.

The block diagram of FIG. 2 provides an overview of the process. A bulk flow of parcels is split into two separated streams of parcels. Each stream is buffered and metered for delivery at a predetermined rate to a human operator. Each operator culls unacceptable items from the stream, faces the parcels so that they can be properly scanned, and singulates any residual unsingulated parcels. The two streams of parcels travel side by side through the scanning station where their labels are read. The scanned parcels are delivered in two streams to the induction sorter, which sorts the parcels from both streams off the sorter.

Although the invention has been described in detail with respect to a few preferred versions, other versions are possible. For example, the bulk parcel flow could be separated into three or more streams, rather than just two. As another example, the cross belt sorter could have more than two lanes and corresponding actuation mechanisms to handle more streams of parcels. Furthermore, the induction sorter could sort to discharge points on both sides. The induction conveyors may be oblique to the induction sorter as shown or perpendicular.

What is claimed is:

1. A method for handling parcels comprising:
    separating a mass flow of parcels into two or more individual streams of parcels;
    singulating the parcels in each of the individual streams of parcels;
    aligning the singulated parcels in each of the individual streams against a respective rail extending in a conveying direction;
    accumulating the singulated and aligned parcels in each of the individual streams;
    conveying the accumulated, singulated, and aligned parcels of each individual stream of parcels one at a time at a steady rate through a corresponding one of two or more individual culling and facing stations;
    manually culling unacceptable parcels from the individual stream of parcels at each culling and facing station as the stream of parcels is conveyed through at the steady rate;
    manually facing acceptable parcels at each culling and facing station so that identifying indicia on the parcels can be read downstream as the stream of parcels is conveyed through at the steady rate.

2. The method of claim 1 further comprising manually singulating acceptable parcels at each culling and facing station that are piggybacked or side by side.

3. The method of claim 1 wherein each culling and facing station is manned by an individual human operator.

4. The method of claim 1 further comprising delivering the individual streams of acceptable parcels to a scanning station and reading the identifying indicia on each of the parcels at the scanning station.

5. The method of claim 1 further comprising delivering the individual streams of acceptable parcels to a sorter.

6. The method of claim 5 further comprising sorting the parcels off one or both sides of the sorter at multiple discharge points along the length of the sorter.

7. The method of claim 4 further comprising:
    feeding the individual streams of parcels exiting the scanning station onto a sorter in parallel lanes;
    discharging a parcel from a spot in a lane closest to a side of the sorter off the side of the sorter at a selected one of multiple discharge points;
    diverting a neighboring parcel from an adjacent lane to occupy the spot vacated by a parcel discharged off the side of the sorter for subsequent discharge from the lane closest to the side of the sorter.

8. The method of claim 7 comprising discharging parcels from lanes closest to both sides of the sorter off the sides of the sorter at multiple discharge points.

9. The method of claim 7 comprising conveying parcels discharged from the sorter on an angle oblique to the lanes of parcels on the sorter.

10. The method of claim 1 comprising:
    accumulating the mass flow of parcels into initially accumulated parcels;
    metering the initially accumulated parcels at a fixed rate before separating the parcels into the two or more streams.

11. The method of claim 1 further comprising increasing the separation between consecutive parcels in each of the streams while aligning the parcels.

* * * * *